March 27, 1956     S. W. WALDMAN     2,740,008
PRESSURE INDICATING DEVICE FOR PNEUMATIC TIRES
Filed April 5, 1955     2 Sheets-Sheet 1
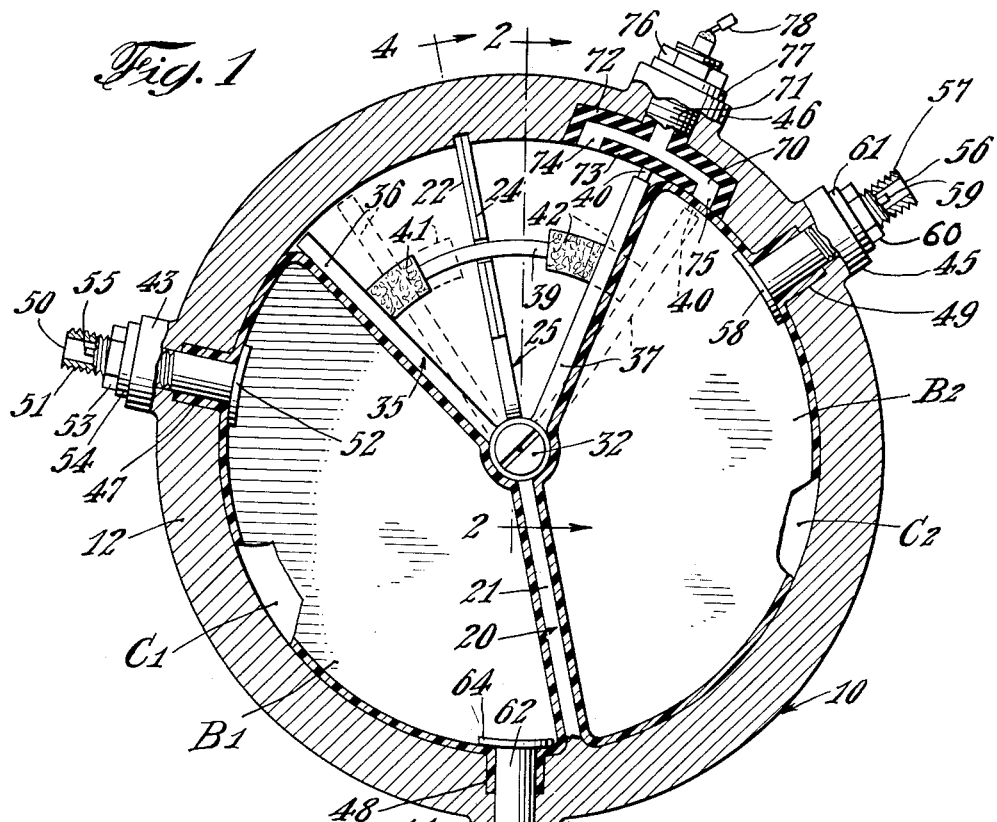
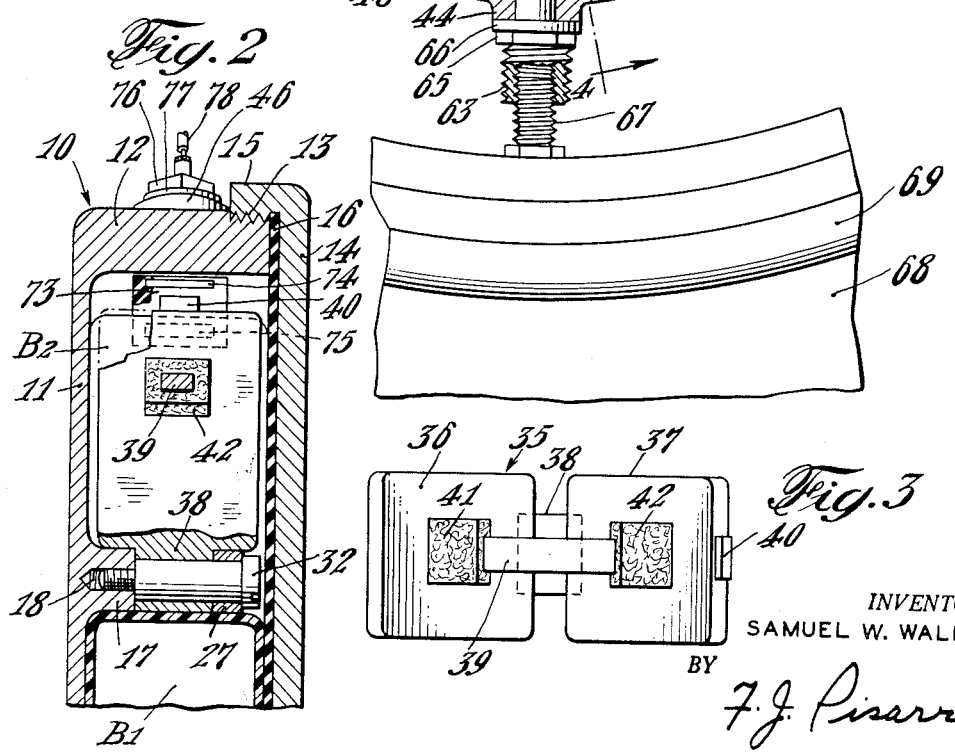
INVENTOR.
SAMUEL W. WALDMAN
BY
F. J. Pisarra
ATTORNEY

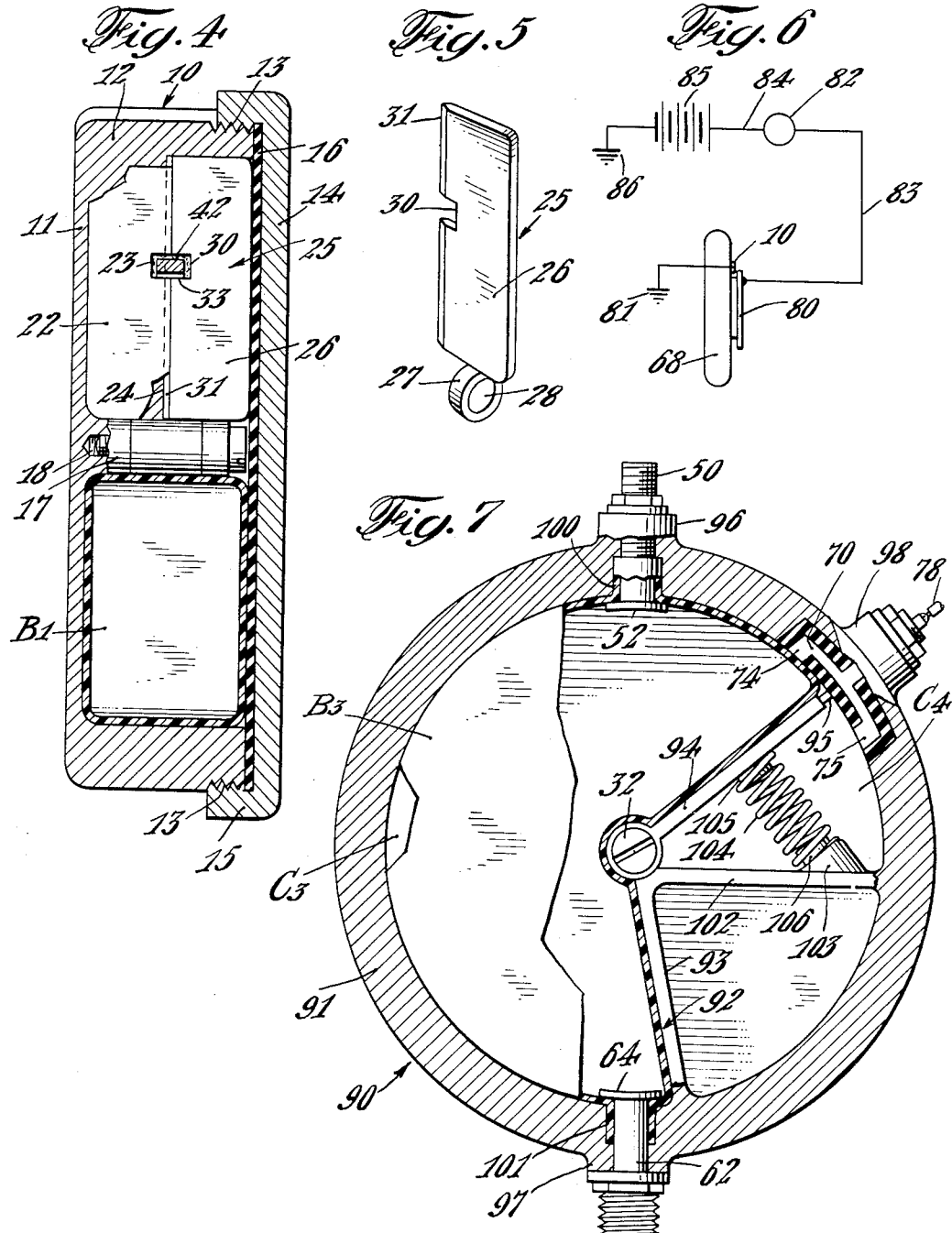

United States Patent Office 2,740,008
Patented Mar. 27, 1956

2,740,008

PRESSURE INDICATING DEVICE FOR PNEUMATIC TIRES

Samuel W. Waldman, Fair Lawn, N. J., assignor of one-third to Philip A. Di Salvo, Fair Lawn, N. J.

Application April 5, 1955, Serial No. 499,282

13 Claims. (Cl. 200—61.25)

This invention relates to a pressure indicating device and more particularly to such a device that is adapted to be advantageously employed with pneumatic tires or the like.

As is generally well known, the useful life, wearability and safety of a pneumatic vehicle tire are directly dependent on the pressure within the tire. In other words, it is essential, from the dual viewpoints of economy of operation and safety in use, that tires be maintained at substantially the pressures for which they are designed. This is true with all pneumatic vehicle tires, regardless of whether they are of the conventional "inner-tube" type or of the more recently developed "tubeless" type, and also regardless of whether they are used on pleasure vehicles, trucks or aircraft.

The device of the instant invention is adapted to be connected to a pneumatic tire and form part of an electric circuit that includes visual or audible signaling means. The parts are so constructed and arranged that the signaling means automatically indicates to the driver of the vehicle when the pressure within the tire has fallen below or risen above preselected limits. The driver, having thus been apprised of the pressure condition of the tire, may and should take proper steps to rectify the condition and thereby avoid damage to the tire and possible accident that might result should the condition continue for an appreciable length of time without correction.

It is the primary object of this invention to provide a pneumatic tire pressure indicating device that has improved features of design and construction.

Another object of the invention is to provide an improved pressure responsive device that is adapted to automatically operate a signaling means when a pneumatic tire becomes overinflated or underinflated.

A further object of the invention is to provide a device of the character indicated that is simple, compact and attractive in design, that is sturdy in construction, that is reasonable in manufacturing and maintenance costs, and that is adapted to be easily and quickly connected to or removed from a tire, as required.

A still further object of the invention is to provide a pneumatic tire pressure indicating device that is capable of performing its intended functions in an entirely satisfactory and trouble-free manner.

To the end that the foregoing objects may be readily obtained, a preferred and recommended form of pressure indicating device constructed in accordance with the invention comprises a cylindrical housing having a removable cover. The interior of the housing is divided into first and second compartments by a partitioning means which includes a stationary wall extending diametrically across the housing and having a through aperture. A lever is pivotally connected to the housing and constitutes a part of the partitioning means. The lever is generally A-shaped and includes a pair of divergent arms and a cross-arm that extends through the aperture.

A first inflatable bag is positioned in the first compartment, while a second inflatable bag is positioned in the second compartment. The bags bear against corresponding divergent arms of the lever. The housing is provided with first and second conduits that communicate with the first bag. The first conduit carries a spring-pressed check valve that permits ingress of air under pressure into the bag but normally prevents egress of air therethrough. The second conduit is adapted to be connected to the air inlet of a tire. The housing is also provided with a third conduit which communicates with the second bag. The third conduit has a spring-pressed check valve that may be the same as the earlier referred to valve.

The tire and first bag are inflated to the desired pressure by means of air admitted therein through the first conduit. The second bag is also inflated by air admitted therein through the third conduit until the pressure therein balances that in the first bag and tire.

Secured to one of the divergent arms of the lever is a first electric contact that is adapted to engage a second electric contact positioned in the wall of the housing. When the pressure of the air in the tire is within predetermined limits, the contacts are out of engagement. Should the tire become overinflated or underinflated, the differential in pressure in the bags affects pivotal movement of the lever, causing the first contact to engage the second contact. This engagement is adapted to close an electric circuit that includes a signaling means which may be a visual signal, such as an electric lamp or an audible signal, such as an electrically actuated horn. Thus when a particular tire becomes overinflated or underinflated, the driver is apprised of this condition and will take necessary steps to correct the same.

The enumerated objects, as well as other objects, together with the advantages of the invention, will be readily understood by persons versed in the art upon consideration of the following detailed description, taken in conjunction with the accompanying drawings which respectively describe and illustrate a preferred embodiment of the invention and a modification thereof.

In the drawings:

Fig. 1 is a transverse cross-sectional view of a pressure indicating device constructed in accordance with the invention, certain parts being broken away for better illustration;

Fig. 2 is a view taken along line 2—2 of Fig. 1;

Fig. 3 is an end view of the A-shaped lever shown in Fig. 1;

Fig. 4 is a view taken along line 4—4 of Fig. 1;

Fig. 5 is an isometric view of an element of the partitioning means, which element is also shown in Fig. 4;

Fig. 6 is a wiring diagram showing the pressure indicating device of this invention connected to a signaling means; and Fig. 7 corresponds to Fig. 1 and illustrates a modification thereof.

Referring now to the drawings, wherein like reference characters denote corresponding parts throughout the several views, and more particularly to Figs. 1 through 6, the pressure indicating device illustrated therein comprises a housing, generally indicated by numeral 10 and including a bottom wall 11, an upstanding circular side wall 12 that is externally threaded at its upper end 13, and a removable cover 14. The cover is provided with a circular flange 15 that is internally threaded to engage the external threads of the housing side wall. Interposed between the side wall and the cover is a gasket 16 for providing an effective seal. A boss 17 (Fig. 2) projects upwardly from the center of bottom wall 11 and has a central tap 18.

The housing is equipped with a partitioning means 20 which divides its interior into a pair of compartments, namely, C1 and C2. The partitioning means comprises parts 21 and 22 that are integral with the housing. Part 21 extends upwardly from bottom wall 11 to the cover. Part 22 also extends upwardly from the bottom wall but terminates approximately midway between the bottom wall and the cover and has a notch 23 and a top groove 24 (Figs. 1 and 4). The partitioning means includes a removable section 25, best shown in Fig. 5 and comprising a plate 26 having an extension 27 which has an opening 28. Plate 26 is provided with a notch 30 and a V or knife edge 31. Section 25 is secured in the position shown in Fig. 4 by a screw 32 that engages the threads in tap 18. As is shown in Fig. 4, edge 31 of the plate 26 registers with the groove 24 in partition part 22, and notches 23 and 30 define a rectangular aperture 33.

The partitioning means additionally includes an inverted A-shaped lever 35 which is mounted in the housing for pivotal movement about screw 32. As is best shown in Figs. 1 and 3, lever 35 comprises a pair of divergent arms 36 and 37 which are joined by an element 38 having an opening through which screw 32 extends. The lever also includes an arcuate crossarm 39 that is movable through aperture 33. A contact finger 40 is secured to the free end of arm 37. This finger, as well as lever 35 and certain other parts of the device, is electrically conductive. A pair of sealing elements 41 and 42 are carried by crossarm 39. The sealing elements are preferably in the nature of split rings and are made of a suitable material, such as felt or rubber.

Projecting radially outwardly from the housing side wall is a plurality of bosses 43, 44, 45 and 46, each of which has a drilled-through opening communicating with the interior of the housing. Inflatable bags B1 and B2 are, respectively, positioned in compartments C1 and C2. These bags are made of a suitable flexible, distortable and/or resilient material, such as rubber or an appropriate synthetic plastic material that is impervious to air. Bag B1 has a pair of tubular extensions 47 and 48, while bag B2 has a like extension 49. A conduit 50 is externally threaded as indicated at 51 and projects through extension 47 and the opening in boss 43. This conduit has a circular flange 52 that bears against the inner surface of bag B1 in the region of extension 47 to form a fluid-tight seal between the extension and the housing. Conduit 50 is maintained in the illustrated position by a nut 53. Interposed between this nut and the end of boss 43 is a washer 54. Conduit 50 is provided with a conventional spring-pressed check valve 55 which may be of the type presently available under the trade name "Schrader." This valve permits the ingress of air under pressure into bag B1 but normally prevents egress of air from the bag through conduit 50.

A conduit 56, which is preferably the same as conduit 50, projects through tubular extension 49 and the opening in boss 45. As in the case of conduit 50, conduit 56 is externally threaded as indicated at 57 and has a circular flange 58. Conduit 56 is likewise provided with a check valve 59 and is maintained in the illustrated position by a nut 60 and a washer 61.

A further conduit 62, similar to conduits 50 and 56, projects through tubular extension 48 of bag B1 and has external threads 63 and a circular flange 64. Conduit 62 is provided with a nut 65 and a washer 66. This conduit does not have a check valve. Instead it is internally threaded to receive the threaded stem 67 of a tire 68 that is mounted on a vehicle wheel rim 69.

An electrically conductive contact member 70 has a threaded stem 71 which projects through the opening in boss 46. This member is provided with an outer sheath of suitable insulating material 72 and is grooved to receive a strip of electrical insulating material 73. Member 70 is so configured that parts 74 and 75 thereof are exposed to the interior of the housing. This member is maintained in the illustrated position by a nut 76 and a washer 77 and is coupled at its outer end to a connector 78 that is adapted to make electric contact with the brake drum 80 of the wheel on which tire 68 is mounted (Fig. 6).

Referring to Fig. 6, housing 10 is electrically grounded as indicated at 81. This grounding is effected through lever 35. The lever is adapted to be series-connected to a signaling device 82 that is conveniently mounted on the dashboard of the vehicle through contact finger 40, contact member 70, connector 78, brake drum 80 and a conductor wire 83. The signaling device is connected by a conductor wire 84 to the vehicle battery 85 which is grounded as indicated at 86. The signaling device may be a visual signaling means, such as an electric lamp, or may be an audible signaling means, such as a horn or buzzer. If desired, both visual and audible signaling means may be provided.

For the purpose of describing briefly the operation of the form of the invention shown in Figs. 1 through 6, it is first assumed that the device is assembled and connected to the tire and to the signaling device. It is also assumed that the pressure for which the tire is designed is 25 pounds per square inch. Conduit 50 is connected to a source of compressed air and air is admitted by way of this conduit and valve 55 into bag B1 and thence by way of conduit 62 and tire inlet 67 into tire 68 until the desired pressure of 25 pounds is attained in the tire. Conduit 50 is then disconnected from the source of compressed air supply and the valve 55 automatically closes. Air from the source of compressed air supply is then admitted into bag B2 by way of conduit 56 and valve 59 until the pressure in bag B2 reaches 25 pounds, thereby balancing the pressure in the tire and in bag B1. Caps (not shown) are attached to the outer ends of conduits 50 and 56 to protect these conduits and the corresponding valves from dust, dirt and other foreign material.

With the pressures in bags B1 and B2 in balance, the parts will be in the relative position shown in Fig. 1 and electric contact 40 will be in engagement with insulator strip 73, thereby opening the electric circuit to the signaling device. At such time as the pressure in the tire rises substantially above 25 pounds, lever 35 moves in a clockwise direction about pivot screw 32 (Fig. 1) to the broken line position shown in Fig. 1. This causes contact finger 40 to engage portion 75 of contact member 70, thereby completing the circuit to the signaling device and allowing that device to be energized by battery 85. Should the pressure in the tire drop substantially below 25 pounds, bag B2, due to its superior pressure, will move lever 35 in a counterclockwise direction as viewed in Fig. 1 until contact finger 40 engages portion 74 of contact member 70, thereby completing the circuit to the signaling device.

Thus it will be observed that the pressure indicating device is adapted to close the electric circuit to the signaling device at such times as the tire may, for any reason, become overinflated or underinflated. Sealing elements 41 and 42 limit pivotal movement of lever 35 in either direction and prevent passage of air from one compartment to the other should either bag develop a leak. It will be noted from an examination of Fig. 1, that sealing element 41 limits clockwise pivotal movement of the lever, while sealing element 42 limits counterclockwise pivotal movement of the lever.

Reference is next had to Fig. 7 for an understanding of the modification of the invention illustrated therein. In the modification, only a single inflatable bag B3, corresponding to bag B1, is utilized. The device includes a housing 90 that is similar to housing 10 and includes an upstanding circular side wall 91. Partitioning means 92 divides the interior of the housing into compartments C3 and C4. The partitioning means includes a stationary section 93 and a movable section or lever 94 that is mounted for pivotal movement about screw 32. This lever carries a contact finger 95 at its free end. The housing is provided with a plurality of external bosses 96, 97 and 98, corresponding to bosses 43, 44 and 46, respectively, of Fig. 1.

Bag B3 has a pair of tubular extensions 100 and 101 that correspond to the tubular extensions of the earlier described form of the invention. The tubular extensions are maintained in the illustrated position by conduits 50 and 62, earlier described. Tire inflating air is supplied to the device and to the tire by way of conduit 50. The housing includes a rib 102 that has an integral boss 103. A helical compression spring 104 bears against lever 94 and boss 103 and is maintained in position by aligning pins 105 and 106. Spring 104 is used in lieu of a second inflatable bag to counterbalance the pressure in bag B3. It is believed that the construction and operation of the illustrated modification of the invention will be readily apparent from the above description, taken in conjunction with Fig. 7.

From the foregoing, it is believed that the construction, operation and advantages of my present invention will be readily comprehended by persons skilled in the art. It is to be clearly understood, however, that the forms of my invention herewith shown and described are to be taken as examples of the same and that various changes in the shape, size and arrangement of parts may be made without departing from the scope of the invention, it being intended that all matter contained in the description or shown in the drawings shall be interpreted as illustrative only and not in a limiting sense.

I claim:

1. In a pressure indicating device for pneumatic tires, a housing, means dividing the interior of the housing into first and second compartments, said means including a movable member, first and second conduits carried by the housing and communicating with the first compartment, a valve connected to the first conduit, said valve permitting ingress of air under pressure into the first compartment through the first conduit and preventing egress of air therethrough, said second conduit being adapted to be connected to the air inlet of a tire, means subject to air pressure in the first compartment for urging the movable member in one direction, and means in the second compartment for urging the movable member in the opposite direction.

2. In a pressure indicating device for pneumatic tires, a housing, means dividing the interior of the housing into first and second compartments, said means including a rigid movable member, first and second conduits carried by the housing and communicating with the first compartment, a valve connected to the first conduit, said valve permitting ingress of air under pressure into the first compartment through the first conduit and preventing egress of air therethrough, said second conduit being adapted to be connected to the air inlet of a tire, yieldable means subject to air pressure in the first compartment for urging the movable member in one direction, and yieldable means in the second compartment for urging the movable member in the opposite direction.

3. In a pressure indicating device for pneumatic tires, a housing, means dividing the interior of the housing into first and second compartments, said means including a lever pivotally connected to the housing, first and second conduits carried by the housing and communicating with the first compartment, a valve connected to the first conduit, said valve permitting ingress of air under pressure into the first compartment through the first conduit and preventing egress of air therethrough, said second conduit being adapted to be connected to the air inlet of a tire, means subject to air pressure in the first compartment for urging the lever in one direction about its pivotal connection with the housing, and means in the second compartment for urging the lever in the opposite direction about its pivotal connection with the housing.

4. In a pressure indicating device for pneumatic tires, a housing, partitioning means dividing the interior of the housing into first and second compartments, said partitioning means including a lever pivotally connected to the housing, an inflatable bag in the first compartment, first and second conduits carried by the housing and communicating with the bag, a valve connected to the first conduit, said valve permitting ingress of air under pressure into the bag through the first conduit and preventing egress of air therethrough, said second conduit being adapted to be connected to the air inlet of a tire, said bag in inflated condition bearing against the partitioning means and urging the lever in one direction about its pivotal connection with the housing, and means in the second compartment urging the lever in the opposite direction about its pivotal connection with the housing.

5. A pressure indicating device according to claim 4 including a first electric contact carried by and movable with the lever and a second electric contact secured to the housing, said first contact engaging the second contact when the lever is in at least one predetermined angular position, said second contact being adapted to be electrically connected to a signaling device.

6. In a pressure indicating device for pneumatic tires, a housing, partitioning means dividing the interior of the housing into first and second compartments, said partitioning means including a lever pivotally connected to the housing, an inflatable bag in the first compartment, first and second conduits carried by the housing and communicating with the bag, a valve connected to the first conduit, said valve permitting ingress of air under pressure into the bag through the first conduit and preventing egress of air therethrough, said second conduit being adapted to be connected to the air inlet of a tire, said bag in inflated condition bearing against the partitioning means and urging the lever in one direction about its pivotal connection with the housing, and an inflatable bag in the second compartment, said last mentioned bag in inflated condition bearing against the partitioning means and urging the lever in the opposite direction about its pivotal connection with the housing.

7. In a pressure indicating device for pneumatic tires, a housing, partitioning means dividing the interior of the housing into first and second compartments, said partitioning means including a lever pivotally connected to the housing, an inflatable bag in the first compartment, first and second conduits carried by the housing and communicating with the bag, a valve connected to the first conduit, said valve permitting ingress of air under pressure into the bag through the first conduit and preventing egress of air therethrough, said second conduit being adapted to be connected to the air inlet of a tire, said bag in inflated condition bearing against the partitioning means and urging the lever in one direction about its pivotal connection with the housing, a second inflatable bag in the second compartment, a third conduit carried by the housing and communicating with the second bag, a valve connected to the third conduit, said last mentioned valve permitting ingress of air under pressure into the second bag through the third conduit and preventing egress of air therethrough, said second bag in inflated condition bearing against the partitioning means and urging the lever in the opposite direction about its pivotal connection with the housing.

8. In a pressure indicating device for pneumatic tires, a housing, partitioning means dividing the interior of the housing into first and second compartments, said partitioning means comprising a stationary wall extending across the interior of the housing and having a through aperture and a lever pivotally connected to the housing, said lever comprising a pair of divergent arms and a crossarm connected to the divergent arms and extending through the aperture, an inflatable bag in the first compartment, first and second conduits carried by the housing and communicating with the bag, a valve connected to the first conduit, said valve permitting ingress of air under pressure into the bag through the first conduit and preventing egress of air therethrough, said second conduit being adapted to be connected to the air inlet of a tire, said bag in inflated condition bearing against one of the divergent arms and urging the lever in one direction about its pivotal connection with the housing, and means in the second compartment bearing against the other divergent arm and urging the lever in the opposite direction about its pivotal connection with the housing.

9. A pressure indicating device according to claim 8, including a first electric contact carried by and movable with one of the divergent arms and a second electric contact secured to the housing, said first contact engaging the second contact when the lever is in at least one predetermined angular position, said second contact being adapted to be electrically connected to a signalling device.

10. A pressure indicating device according to claim 8 wherein the last mentioned means comprises an inflatable bag in the second compartment.

11. A pressure indicating device according to claim 8, including means carried by the lever for engaging the stationary wall and preventing passage of air through the aperture in response to predetermined pivotal movement of the lever in either direction.

12. In a pressure indicating device for pneumatic tires, a housing, partitioning means dividing the interior of the housing into first and second compartments, said partitioning means including a lever pivotally connected to the housing, an inflatable bag in the first compartment, first and second conduits carried by the housing and communicating with the bag, a valve connected to the first conduit, said valve permitting ingress of air under pressure into the bag through the first conduit and preventing egress of air therethrough, said second conduit being adapted to be connected to the air inlet of a tire, said bag in inflated condition bearing against and urging the lever in one direction about its pivotal connection with the housing, and spring means in the second compartment urging the lever in the opposite direction about its pivotal connection with the housing.

13. A pressure indicating device according to claim 12, including a first electric contact carried by and movable with the lever and a second electric contact secured to the housing, said first contact engaging the second contact when the lever is in at least one angular position, said second contact being adapted to be electrically connected to a signaling device.

UNITED STATES PATENTS

References Cited in the file of this patent

| | | |
|---|---|---|
| 2,119,287 | Pratt | May 31, 1938 |
| 2,308,372 | Krantz | Jan. 12, 1943 |
| 2,445,959 | Luper | July 27, 1948 |
| 2,481,534 | Robertson | Sept. 13, 1949 |
| 2,554,594 | Shea | May 29, 1951 |